United States Patent
Inagaki et al.

(10) Patent No.: US 9,611,157 B2
(45) Date of Patent: Apr. 4, 2017

(54) PLANT-DERIVED FLOCCULANT, FLOCCULANT MIXTURE, METHOD OF FLOCCULATION, AND METHOD FOR PREPARING PLANT-DERIVED FLOCCULANT

(75) Inventors: Yasuhito Inagaki, Kanagawa (JP); Kohei Shimizu, Kanagawa (JP); Masato Hasegawa, Suzhou (CN)

(73) Assignees: SONY CORPORATION, Tokyo (JP); DEXERIALS CORPORATION, Tokyo (JP)

( * ) Notice: Subject to any disclaimer, the term of this patent is extended or adjusted under 35 U.S.C. 154(b) by 579 days.

(21) Appl. No.: 13/979,819

(22) PCT Filed: Jan. 6, 2012

(86) PCT No.: PCT/CN2012/070105
§ 371 (c)(1),
(2), (4) Date: Jul. 15, 2013

(87) PCT Pub. No.: WO2012/094967
PCT Pub. Date: Jul. 19, 2012

(65) Prior Publication Data
US 2013/0299433 A1 Nov. 14, 2013

(30) Foreign Application Priority Data
Jan. 14, 2011 (CN) .......................... 2011 1 0007995

(51) Int. Cl.
*B01J 20/24* (2006.01)
*C02F 1/54* (2006.01)
*C02F 1/56* (2006.01)
*B03D 1/01* (2006.01)
*C02F 1/52* (2006.01)

(52) U.S. Cl.
CPC ................. *C02F 1/54* (2013.01); *B01J 20/24* (2013.01); *C02F 1/5263* (2013.01); *Y02W 10/37* (2015.05)

(58) Field of Classification Search
CPC .......... A01H 5/00; A01H 5/02; A01H 5/0238; A01H 5/04; A01H 5/08; C02F 1/5263; C02F 1/64; C02F 1/56; C02F 3/00; C02F 3/32; C02F 3/327; C02F 1/54; B03D 1/001; B03D 1/014; B03D 1/01; B03D 1/016; B01J 20/24; B01J 2020/485
USPC .............. 210/602, 702, 730, 733, 734, 735; 252/180; 426/390, 416, 443, 615, 665; 800/295, 298, 323
See application file for complete search history.

(56) References Cited

U.S. PATENT DOCUMENTS

| | | | | |
|---|---|---|---|---|
| 2,117,378 | A * | 5/1938 | Tiffany | C02F 1/5263 209/5 |
| 3,725,291 | A * | 4/1973 | Serbus et al. | C02F 1/286 210/679 |
| 4,242,365 | A * | 12/1980 | Numata | A23L 1/2123 426/438 |
| 5,112,500 | A * | 5/1992 | Jones | C02F 1/54 210/728 |
| 5,342,525 | A * | 8/1994 | Rowsell | B09C 1/00 210/611 |
| 5,433,865 | A * | 7/1995 | Laurent | C02F 1/5263 210/727 |
| 5,702,604 | A * | 12/1997 | Yamasaki | B01D 53/18 210/151 |
| 5,816,305 | A * | 10/1998 | May | A47G 27/0206 150/165 |
| 5,958,182 | A * | 9/1999 | Hondroulis | D21B 1/04 162/24 |
| 6,436,288 | B1 * | 8/2002 | Burcham | C02F 3/04 210/505 |
| 6,749,748 | B1 * | 6/2004 | Macpherson | C02F 1/5263 210/198.1 |
| 7,943,049 | B1 * | 5/2011 | Alcantar | C02F 1/5263 210/728 |
| 8,309,006 | B2 * | 11/2012 | Kawashiri | B27N 3/002 264/172.17 |

(Continued)

FOREIGN PATENT DOCUMENTS

| | | |
|---|---|---|
| CN | 1266821 | 9/2000 |
| CN | 101863543 | 10/2010 |

(Continued)

OTHER PUBLICATIONS

Derwent Translation of DE4133920; Nov. 1993; Kunzek et al.*
Derwent Translation of JP62-289300; Dec. 1987; Aoyma et al.*
Publication: Kjoniksen et al; "Viscosity of Dilute Aqueous Solutions of Hydrophobically Modified Chitosan and its Unmodified Analogue at Different Conditions of Salt and Surfactant Concentrations"; published in Langmuir 1997, vol. 13, pp. 4948-4952, published Jun. 13, 1997.*
Translated Derwent Abstract of JP 410128010, publication date: May 1998.*

(Continued)

*Primary Examiner* — Joseph Drodge
(74) *Attorney, Agent, or Firm* — K&L Gates LLP

(57) ABSTRACT

Disclosed are a plant-derived flocculant and a flocculant mixture having a higher flocculation capacity. The plant-derived flocculant comprises at least one of a dried matter of *Corchorus olitorius*, a dried matter of *Begonia fimbristipula*, a dried matter of bananas, and a dried matter of *Corchorus capsularis*; the plant-derived flocculant has a colloid equivalent of −1.5 mEq/g to −0.20 mEq/g, and the 2 weight % aqueous solution of the plant-derived flocculant has a viscosity of at least $6.0 \times 10^{-3}$ Pa·s (6.0 cP). The flocculant mixture of the invention comprises the plant-derived flocculant described above and a synthetic polymer flocculant having a colloid equivalent of −4.5 mEq/g to −1.2 mEq/g, whose 0.2 weight % aqueous solution has a viscosity of $1.3 \times 10^{-1}$ Pa·s to $4 \times 10^{-1}$ Pa·s (130 cP to 400 cP).

25 Claims, No Drawings

(56) References Cited

U.S. PATENT DOCUMENTS

| | | | | |
|---|---|---|---|---|
| 8,518,268 B1 * | 8/2013 | Nauertz | ............... | B01D 21/003 |
| | | | | 210/206 |
| 9,101,910 B2 * | 8/2015 | Siwek | .................... | B01J 20/043 |
| 9,163,374 B2 * | 10/2015 | Alcantar | .................. | B01J 20/24 |

FOREIGN PATENT DOCUMENTS

| | | | | | |
|---|---|---|---|---|---|
| DE | 4133920 | * | 11/1993 | ................ | C08L 5/06 |
| GB | 411602 | * | 6/1934 | | |
| JP | 62-289300 | * | 12/1987 | .............. | C02F 11/14 |
| JP | 410128010 | * | 5/1998 | | |
| JP | 11-114313 | | 4/1999 | | |
| JP | 11-114314 | | 4/1999 | | |
| JP | H11-309305 A | | 11/1999 | | |
| JP | 2000-325966 | | 11/2000 | | |
| JP | 2005-177668 | | 7/2005 | | |
| JP | 4422202 B1 | | 2/2010 | | |
| WO | 2010/131492 | | 11/2010 | | |

OTHER PUBLICATIONS

Notification of Reason(s) for Refusal with English translation issued in connection with Japanese Patent Application No. 2013-548726, dated Jan. 27, 2015. (30 pages).

Eizo Omori, Polymeric Flocculant, Polymer Publishing Inc., Oct. 25, 1977, Third Edition, p. 87.

Shimada Hidemasa, Taiwan Jute, Homepage of ATOMI University, Library on Willow, News of cherry blossoms from managing director, ATOMI Adventive Plant List, vol. 4, Agricultural production List, 2010, URL: http://www2.mmc.atomi.ac.jp/web01/Flower%20Information%20by%20Vps/Flower%20Albumn/ch4-vegitables/taiwan%20tsunaso.html.

Japanese Office Action issued Jul. 21, 2015, for corresponding Japanese Appln. No. 2013-548726 (20 pages).

Extended European Search Report issued Sep. 28, 2016 in corresponding European application No. 12734036.2 (7 pages).

* cited by examiner

PLANT-DERIVED FLOCCULANT, FLOCCULANT MIXTURE, METHOD OF FLOCCULATION, AND METHOD FOR PREPARING PLANT-DERIVED FLOCCULANT

CROSS REFERENCES TO RELATED APPLICATIONS

The present application is a national stage of International Application No. PCT/CN2012/070105 filed on Jan. 6, 2012 and claims priority to Chinese Patent Application No. 201110007995.0 filed on Jan. 14, 2011, the disclosure of which is incorporated herein by reference.

BACKGROUND

The invention relates to a plant-derived flocculant, a flocculant mixture, a method of flocculation, and a method for preparing the plant-derived flocculant.

With mass production and mass consumption in recent years, suspended particles discharged in water such as plant drained water keep increasing. Therefore, synthetic polymer flocculants such as polyacrylamide and copolymers thereof are generally used as flocculants for flocculate/separate microparticles dispersed in water, so as to clarify the water. However, there exist the following issues for the synthetic polymer flocculants:

[1] Even they are discharged into soil, they are accumulated rather than degraded.

[2] Their monomers themselves (acrylamide, etc.) are toxic.

[3] They are synthesized using fossil resources such as petroleum which are not renewable materials for human.

Therefore, from the perspective of environmental pollution, safety concerns and exhaustion of fossil resources, development of flocculants having good biodegradability and high safety are desired.

For natural polymer flocculants, although guar gum (seed extract of guar from Family Fabaceae), sodium alginate (extract of brown algae such as kelp, $Ecklonia\ cava$, $Eisenia\ bicyclis$, etc.), starch, gelatin, chitosan, etc. have been studied, these materials have not been widely used yet because they either are difficult to raise and cultivate, or have limited use and poor flocculability.

Moreover, according to Japanese Patent Laid-open H11-114313, a flocculant that comprises at least one of Molokheiya, dried Molokheiya, and Molokheiya extract is widely known.

PRIOR ART DOCUMENT

Patent Document

Patent document 1: Japanese Patent Laid-open H11-114313

SUMMARY

Problems to be Solved by the Invention

Although the flocculant disclosed in the aforementioned Japanese Patent Laid-open H11-114313 can effectively flocculate suspended particles, a flocculant with a higher flocculability is still desirable.

Therefore, an object of the invention is to provide a plant-derived flocculant with a higher flocculability, a flocculation mixture based on said plant-derived flocculant, and a method for preparing said plant-derived flocculant.

Means to Solve the Problems

The plant-derived flocculant of the invention for achieving the aforementioned object has a colloid equivalent of $-1.5$ mEq/g to $-0.20$ mEq/g, and its 2 weight % aqueous solution has a viscosity of more than $6.0 \times 10^{-3}$ Pa·s (6.0 cP).

The flocculant mixture of the invention for achieving the aforementioned object comprises the plant-derived flocculant of the invention and a synthetic polymer flocculant having a colloid equivalent of $-4.5$ mEq/g to $-1.2$ mEq/g, whose 0.2 weight % aqueous solution has a viscosity of $1.3 \times 10^{-1}$ Pa·s to $4 \times 10^{-1}$ Pa·s (130 cP to 400 cP).

The flocculation method of the invention for achieving the aforementioned object is adding the aforementioned plant-derived flocculant of the invention into a suspension to flocculate and isolate the microparticles in the suspension.

The method for preparing the plant-derived flocculant of the invention for achieving the aforementioned object is a method for preparing the aforementioned plant-derived flocculant of the invention by drying the plant (sometimes also called the "plant raw material") at a temperature lower than 100° C.

The use of the plant-derived dried material for achieving the aforementioned object is to prepare a flocculant, wherein the colloid equivalent of the plant-derived dried material is $-1.5$ mEq/g to $-0.20$ mEq/g, and its 2 weight % aqueous solution has a viscosity of at least $6.0 \times 10^{-3}$ Pa·s.

Effect of the Invention

For the plant-derived flocculant of the invention, the plant-derived flocculant in the flocculant mixture of the invention, the plant-derived flocculant in the flocculation method of the invention, or the plant-derived flocculant prepared by the method for preparing the plant-derived flocculant of the invention, it has an excellent flocculation performance since its colloid equivalent and the viscosity of its 2 weight % aqueous solution have been defined. Hence, the supernatant after the flocculation treatment and the filtered water after the dehydration filtration are highly clear. Furthermore, it has high safety to the environment and human beings. Moreover, it is renewable and has excellent flocculation activity, which can be used widely: it is applicable to various fields such as drained water treatment field, water supply/sewage field, fermentation industry, paper industry, construction industry, etc.

Additional features and advantages are described herein, and will be apparent from the following Detailed Description and the figures.

DETAILED DESCRIPTION

The invention is illustrated below based on examples. However, the invention is not limited by the examples. The various values and materials in the examples are merely exemplary. Moreover, the illustration is conducted in the following order.

1. General description of the plant-derived flocculant, the flocculant mixture, the flocculating method, and the method for preparing the plant-derived flocculant of the invention 2. Example 1 (the plant-derived flocculant, the flocculant mixture, the flocculant method, and the method for preparing the plant-derived flocculant of the invention), etc.

[General Description of the Plant-Derived Flocculant, the Flocculant Mixture, the Flocculant Method, and the Method for Preparing the Plant-Derived Flocculant of the Invention]

The plant-derived flocculant of the invention, the plant-derived flocculant in the flocculant mixture of the invention, the plant-derived flocculant in the flocculation method of the invention, or the plant-derived flocculant prepared by the method for preparing the plant-derived flocculant of the invention (the aforementioned is sometimes called "the flocculant in the invention" in general, hereinafter) can be in a form of a dry material comprising *Corchorus olitorius*, or in a form of a dry material comprising *Begonia fimbristipula*, or in a form of a dry material comprising bananas, or in a form of a dry material comprising *Corchorus capsularis*, or in a form of at least one dry material selected from the dry material of *Corchorus olitorius*, the dry material of *Begonia fimbristipula*, the dry material of bananas, and the dry material of *Corchorus capsularis*. For the plant material, any parts such as leaves, stalks, stems, roots, fruits and petals can be used, especially preferred parts such as leaves, stalks, stems and flowers, more preferred parts such as leaves and stalks are desirable because they are convenient for powder processing. As to plant raw material, the location and season of cultivation are not particularly limited. *Corchorus olitorius* is mostly cultivated and harvested in China; *Begonia fimbristipula* is mostly cultivated and harvested in Japan; and bananas are mostly cultivated and harvested in Southeast Asia.

The flocculant of the invention, including the aforementioned preferred forms, is preferably in a form of a dry material obtained by drying the plant (plant material) at a temperature of lower than 100° C. When the plant material is dried at a temperature of at least 100° C., it is possible that heat deterioration occurs to one soluble polymer component of the plant raw material (specifically, for example, polysaccharides which undergo breakage of main chains and pending chains to reduce the molecular weight, and render infusible and carbonized due to intramolecular crosslinking) thereby reducing the flocculation performance. For the drying method, sun drying, drying in the shade, hot wind drying, vacuum drying, freeze drying, and cold drying, etc. can be exemplified.

For the flocculant mixture of the invention, including the aforementioned preferred forms, when in each unit weight of the flocculant mixture, the weight of the plant-derived flocculant is $W_1$ and the weight of the synthetic polymer flocculant is $W_2$, it is desirable that they satisfy the following conditions:

$$2/8 \leq W_1/W_2 \leq 8/2$$

preferably, $$2/8 \leq W_1/W_2 < 3/2.$$

Furthermore, for the flocculation method of the invention, including the aforementioned preferred forms, before the plant-derived flocculant is added into the suspension, it is preferred that the plant-derived flocculant is in a dissolved/dispersed form in the water (partially dissolved, and the rest dispersed, the same hereinafter).

Furthermore, for the flocculation method of the invention, including the aforementioned preferred forms, it can be combined with a synthetic polymer flocculant having a colloid equivalent of −4.5 mEq/g to −1.2 mEq/g, and whose 0.2 weight % aqueous solution has a viscosity of $1.3 \times 10^{-1}$ Pa·s to $4 \times 10^{-1}$ Pa·s (130 cP to 400 cP). In this case, when the weight of the plant-derived flocculant added in each unit weight of the suspension is $W'_1$ and the weight of the synthetic polymer flocculant added is $W'_2$, it is desirable that they satisfy the following conditions:

$$2/8 \leq W'_1/W'_2 \leq 8/2$$

preferably, $$2/8 \leq W'_1/W'_2 < 3/2.$$

In the flocculant mixture or flocculation method of the invention including the preferred forms, the synthetic polymer flocculant can be composed of at least one synthetic polymer flocculant selected from partial hydrolysates of polyacrylamide, copolymers of acrylamide and acrylic acid, and copolymers of acrylamide and metal acrylate.

The synthetic polymer flocculant having such a composition has good compatibility with the plant-derived flocculant, and can cause synergism between their properties, can increase the flocculation speed during the drained water treatment with addition of small amount, and can greatly increase the clarity of the supernatant after the flocculation treatment and the clarity of the filtrate after the dehydration filtration. This is because for sludge particles having different particle sizes and surface electric potential (colloid particles), two flocculants with different colloid equivalent value and aqueous solution viscosity (molecule weight) can achieve different flocculation effects, respectively. It should be noted that for the dehydration treatment, commonly used dehydrators, such as press filter, vacuum dehydrator, belt press dehydrator, centrifugation dehydrator, screw press, etc., can be used.

In addition, for the method for preparing the plant-derived flocculant of the invention including the aforementioned preferred forms, the plant (plant raw material) is crushed before or during dying the plant (plant raw material) at a temperature lower than 100° C.

Colloid equivalent is a quantitative indicator of the charge of a soluble polymer electrolyte. In order to show the excellent flocculation property, it is necessary for the flocculant or synthetic polymer flocculant of the invention to have a certain range of charges. Therefore, based on this, the sludge particles existing in the suspension and having electric potential on the surface are electrostatically neutralized, thereby being flocculated. The colloid equivalent can be calculated by colloid titration. Specifically, after methyl glycol chitosan solution is added to the aqueous solution with the flocculant of the invention and the synthetic polymer flocculant solved/dispersed therein, the excessive portion is titrated with potassium poly(vinyl sulfate) solution. It should be noted that when the colloid equivalent of the flocculant of the invention is lower than −1.5 mEq, the flocculation slows down; and when the value is larger than −0.20 mEq, it may reduce the turbidity of the supernatant after the flocculation.

The viscosity of the aqueous flocculant solution of the invention is an indicator of the molecular weight of the water soluble polymer in the flocculant of the invention that facilitates the flocculation of sludge particles. If the viscosity increases, the flocculation may become too rapid; and if the viscosity decreases, the flocculation may become too slow. When the viscosity of the 2 weight % aqueous solution of the flocculant of the invention is lower than $6.0 \times 10^{-3}$ Pa·s, the flocculation becomes too slow to be practically useful. The viscosity of the aqueous solution can be obtained by the following measurement: the sample, dissolved/dispersed at a certain concentration, is assayed with viscosity meter Model B using No. 1 or No. 2 rotor at 60 rpm at 25° C. Moreover, the viscosity of the synthetic polymer flocculant aqueous solution is defined according to various experiments which determine the viscosity range to allow good compatibility when it is combined with the flocculant of the invention.

For the plant-derived flocculant of the invention, although the effect of the flocculant can be achieved by maintaining the original state of the plant raw material, pulverization (crushing) is desired from the perspective of practical use (perspective of operation). The method for pulverization (crushing) can be any method suitable for the plant raw material, for example, commonly used pulverizer can be used.

The flocculant can be used in a premixed form with the flocculation adjuvants, inorganic flocculants, organic flocculants, nonionic polymer flocculants, anionic polymer flocculants, cationic polymer flocculants, amphoteric polymer flocculants, etc., as shown below, or used in combination (i.e., individually added into the suspension). By mixing or combining with these reagents, the object of further increasing the flocculation can be achieved.

Herein, slaked lime, sodium silicate, bentonite, and fly ash can be exemplified as the flocculant adjuvant.

In addition, aluminum sulfate, polyaluminum chloride (PAC); sodium aluminate; ferrous sulfate, ferric chloride, ferric sulfate, chlorinated copperas, modified basic aluminum sulfate (LACS), and active silicon dioxide can be exemplified as the inorganic flocculant.

Furthermore, dimethyldiallyl ammonium chloride; alkyl/epichlorohydrin polycondensate; polyethylene imine; the polycondensate between alkylene dichloride and polyalkylene polyamine; dicyandiamide-formaldehyde polycondensate; anilinine-formaldehyde copolymer hydrochloride; polyhexamethylenethiourea acetate; and poly vinyl benzyl trimethyl ammonium chloride) can be exemplified as the organic flocculant.

In addition, polyacrylamide; polymethacrylamide; starch; guar gum; gelatin; polyoxyethylene, and polyoxypropylene can be exemplified as the nonionic polymer flocculant.

Furthermore, (meth)acrylic polymers; sodium alginate; guar gum sodium; carboxymethyl cellulose sodium; and starch sodium as the anionic polymer flocculant. Here, for (meth)acrylic polymers, in addition to the aforementioned synthetic polymer flocculant, partial hydrolysates of polymethacrylamide; copolymers of (meth)acrylic acid and (meth)acrylamide or salts thereof; terpolymers of (meth) acrylic acid, (meth)acrylamide, and 2-acrylamido-methyl-propanesulfonic acid, vinylsulfonic acid or vinylmethanesulfonic acid, or salts thereof; and sulfomethylated derivatives of poly(meth)acrylamide and salts thereof can also be exemplified.

In addition, a quaternary ammonium salt of dialkylaminoalkyl(meth)acrylate (the quaternization agent can be methyl chloride, benzyl chloride, etc.) and an acidic salt thereof (the acidic salt can be a salt of an inorganic acid such as a hydrochloride, a sulfate, etc. and a salt of an organic acid such as an acetate, etc.) or a polymer or copolymer thereof with (meth)acrylamide (for example, the methylchloride quaternary ammonium of dimethylaminoethylacrylate, or a polymer or copolymer thereof with acrylamide); a quaternary ammonium of dialkylaminoalkyl(meth)acrylamide or an acidic salt thereof, or a polymer or copolymer thereof with (meth)acrylamide (for example, the copolymer between methylchloride quaternary ammonium of dimethylaminopropylacrylamide and acrylamide); a cationization modified polyacrylamide (for example, the Mannich modified or Hoffmann degraded polyacrylamide); epihalohydrinamine polycondensate (for example, the polycondensate between epihalohydrin and $C_{2-8}$ alkylenediamine); polydimethyldiallylammonium chloride; polyvinylimidazoline and salts thereof; polyvinylamidine and salts thereof; chitosan and salts thereof; polyvinylpyridine and salts thereof; polythiourea; water soluble aniline resin; chloromethyl polystyrene ammonium salt or quaternary amine salt; and polyvinylimidazole and salts thereof can be exemplified as the cationic polymer flocculant.

Furthermore, acrylamide-acrylic acid (or salts thereof)-dialkylaminoalkyl(meth)acrylate (or salts or quaternary ammonium thereof), and polyglutamic acid and salts thereof can be exemplified as the amphoteric polymer flocculant.

In addition, sulfonated polystyrene and salts thereof, sulfonated polyphenylene ether and salts thereof, sulfonated polycarbonate and salts thereof, sulfonated polyphenylene sulfide and salts thereof, and sulfonated polyethylene terephthalate and salts thereof can be exemplified as other polymers. However, sulfonated polyphenylene ether and salts thereof, and sulfonated polycarbonate and salts thereof are preferred.

It should be noted that it is more preferred to be used in combination with an inorganic flocculant, an organic flocculant or an anionic polymer flocculant. When being used in combination with an inorganic flocculant, the flocculant or flocculant mixture of the invention is preferably added to the suspension after the inorganic flocculant. Moreover, when being used in combination with an organic flocculant, the flocculant or flocculant mixture of the invention is preferably added simultaneously with or after the addition of the organic flocculant to the suspension. In addition, when being used in combination with an anionic polymer flocculant, the anionic polymer flocculant is preferably added after or simultaneously with the addition of the flocculant or flocculant mixture of the invention to the suspension. Moreover, when the flocculant or flocculant mixture of the invention is added to the suspension simultaneously with the addition of various flocculants, they can be individually added, or the flocculant or flocculant mixture of the invention can be premixed with the various flocculants before being added. As to the method for adding, the flocculant or flocculant mixture of the invention in a powder form can be directly added to the suspension (drained water), but as mentioned above, it is preferably added into the suspension (drained water) in a state of dissolved/dispersed in water.

Furthermore, chelate resin, chelating agent, activated carbon, ozone water, ion exchange resin and ion exchange membrane, absorption resin, hydrogen peroxide water, chlorine and liquid chlorine, sodium hypochlorite, chlorine dioxide, bleach powder, isocyanuric chloride, kieselguhr, photocatalysts such as titan oxide, and subtreating agents such as a biotreating agent can be mixed with or used in combination with the flocculant or flocculant mixture of the invention.

If desired, the plant raw material, which serves as the raw material of the flocculant of the invention, can be subject to acid and/or alkali treatment.

When the supernatant obtained after the flocculation treatment of the suspension is re-used, or when the cake (dehydrated) and flocculate after the flocculation treatment of the suspension is re-used as compost or feed, if they are mixed or used in combination with a synthetic polymer flocculant, it may affect the environment or human beings. Therefore, in this case, it is preferred to use just the plant-derived flocculant of the invention or use it in combination with other inorganic or naturally occurring agents, such as gum guar, sodium alginate, starch, gelatin, chitosan, etc.

Based on the type of the target suspension and the combination with other agents, the amount of the flocculant or flocculant mixture of the invention added relative to the suspension will vary greatly, but it is about 0.01 mg/l to 2000 mg/l (0.01 ppm to 2000 ppm), preferably 0.1 mg/l to 500 mg/l (0.1 ppm to 500 ppm), and more preferably 5 mg/l to 500 mg/l (5 ppm to 500 ppm). When too little flocculant or flocculant mixture of the invention is added, the desirable flocculation effect may not be obtained, and when too much is added, the flocculation effect may instead be reduced.

EXAMPLE 1

Example 1 relates to the plant-derived flocculant, flocculant mixture, flocculation method and the method for preparing the plant-derived flocculant of the invention.

The plant-derived flocculant of Example 1 had a colloid equivalent of −1.5 mEq/g to −0.20 mEq/g, and its 2 weight % aqueous solution had a viscosity of at least $6.0\times10^{-3}$ Pa·s (6.0 cP). It should be noted that the upper limit of the viscosity of the aqueous solution was not limited, but could be, e.g., $5\times10^{-2}$ Pa·s (50 cP). In addition, the flocculant mixture of Example 1 comprised the plant-derived flocculant of Example 1 and a synthetic polymer flocculant having a colloid equivalent of −4.5 mEq/g to −1.2 mEq/g whose 0.2 weight % aqueous solution has a viscosity of $1.3\times10^{-1}$ Pa·s to $4\times10^{-1}$ Pa·s (130 cP to 400 cP). The flocculation method of Example 1 was adding the plant-derived flocculant of Example 1 to the suspension and flocculating and isolating the microparticles in the suspension. The method for preparing the plant-derived flocculant of Example 1 was the method for preparing the plant-derived flocculant of Example 1 by drying the plant (sometimes also called "plant raw material") at a temperature of lower than 100° C.

For Example 1, *Corchorus olitorius* (leaves, stalks, stems, flowers and roots), *Begonia fimbristipula* (leaves), banana (skin), and *Corchorus capsularis* (leaves and stalks) served as the plant raw material of the plant-derived flocculant. Furthermore, Mizuna (leaves and stalks), Komatsuna (leaves and stalks), spinach (leaves and stalks), Garland chrysantheum (leaves and stalks), *Perilla frutescens viridis* (leaves), Chinese cabbage (leaves and stalks), butterbur, napa cabbage (leaves), cabbage (leaves), mimosa, and Japanese Angelica tree were used as the plant raw material of the flocculant of Comparative Example 1. Then, these plant raw materials were dried at a certain temperature for a certain time with a heat drier so as to obtain the flocculants of Example 1 and Comparative Example 1. The water content of the flocculants of Example 1 and Comparative Example 1, although depending on the drying conditions, could be 4.5 weight %~25 weight %. The flocculants of Example 1 and Comparative Example 1 were obtained by crushing with a food processor for cooking.

Furthermore, for the synthetic polymer flocculant, the commercially available partial hydrolysates of polyacrylamide having different colloid equivalent and aqueous solution viscosity (polymer flocculant A-polymer flocculant F) was used. It should be noted that the extents of the partial hydrolysis of the polymer flocculant A-polymer flocculant F were different.

The measurement of the viscosity of the aqueous solution was based on the follow method, i.e., the flocculants of the example and the comparative example were added into pure water and dissolved/dispersed, thereby forming a 2 weight % aqueous solution. Then, the viscosity of the aqueous solution was measured using B Type viscometer (manufactured by Toky Sangyo). More particularly, the temperature of the aqueous solution was adjusted to 25° C., and the measurement was conducted using No. 1 rotor at the spinning speed of 60 rpm. It should be noted that for viscosity measurement of the aqueous solution of the synthetic polymer flocculant, it was formulated into 0.2 weight % aqueous solution.

The measurement of the colloid equivalent value was based on the following method, i.e., 50 ppm aqueous solutions of the flocculants of Example 1 and Comparative Example 1 were formulated. Specifically, 0.2 of various flocculants of Example 1 and Comparative Example 1 (converted to the weight of the dry product) were precisely weighed and placed in a conical flask and dissolved/dispersed with 100 ml ion exchange water. Furthermore, 390 ml ion exchange water was added to 10 ml of such aqueous solution as the measurement sample.

For the measurement of the colloid equivalent value, 100 ml measurement sample was placed in the conical flask and 0.5 ml of 1/10 equivalent concentration sodium hydroxide aqueous solution was added with agitation. Then, 5 ml of 1/200 equivalent concentration methyl glycol chitosan solution was added with agitation for 5 minutes. Furthermore, 2 to 3 drops of toluidine blue was added and a titration was conducted with 1/400 equivalent concentration of polyvinyl potassium sulfate reagent. The titration speed was 2 ml/min. The endpoint was when the test sample turned purple from blue and maintained this state for at least 30 seconds.

It should be noted that as the blank experiment for the colloid equivalent value measurement, 100 ml ion exchange water was used as the test sample for the same operations as above.

Here, the absolute value of the colloid equivalent value (unit: mEq/g) could be calculated according to the following equation.

The absolute value of the colloid equivalent value=

|1/2×(titration amount of the test sample−titration amount of the blank experiment)×(titration value of 1/400 equivalent concentration polyvinyl potassium sulfate reagent)|

The following suspension was used as the suspension (drained water) for the flocculation assessment. That is, the pH of the waste solution discharged from a semiconductor plant (containing hydrogen fluoride and phosphoric acid) was adjusted to 8 by adding slaked lime. 500 ppm aluminum sulfate was added to the precipitated calcium fluoride and calcium phosphate for condensation, and the resultant solution was used as the suspension for assessment. It should be noted that the suspension for assessment had a pH of 6.8, suspended solids (SS) of 2.5 weight %, and an electric conductivity (EC) of 0.246 S/m.

For assessment of flocculation, the following method was used. That is, 100 ml suspension for assessment was added to a 200 ml cylinder with a cork of the same material. Then, the flocculants of the example and comparative example were added by pipetting, so that certain concentration of the polymer components and the solid components relative to the suspension were reached (2.5 ppm or 10 ppm). Then, the cylinder was immediately inverted for agitation for 10 times. Subsequently, it was left to stand to measure the settling speed of the suspended particles. It should be noted that the settling speed was calculated according to the time consumed for the flocculation interface dropping from 80 ml to 60 ml. Moreover, the clarity of the supernatant after 3 minute stand was assessed by visual observation. Then, the flocculation solution was filtered by gravity using filter cloth (twill) made by polypropylene and the clarity of the filtrate was assessed by visual observation. The aforementioned measurement results are shown in Tables 1-Table 3.

TABLE 1

| Item | Unit | Example | | | | |
|---|---|---|---|---|---|---|
| | | 1-A | 1-B | 1-C | 1-D | |
| Type of plant raw material | | Corchorus olitorius | Begonia fimbristipula | banana skin | Corchorus capsularis | |
| Drying temperature (2 hr) | | 90 | 90 | 90 | 90 | |
| Viscosity of 2% aqueous solution | $10^{-3}$ P · as | 22 | 9.8 | 6.2 | 26 | |
| Colloid equivalent | mEq/g | −0.30 | −1.49 | −0.22 | −0.40 | |
| Synthetic polymer flocculant | | — | — | — | — | |
| Colloid equiavlant value | mEq/g | — | — | — | — | |
| Viscosity of 0.2% aqueous solution | $10^{-3}$ P · as | — | — | — | — | |
| Amount added | | | | | | |
| Plant/polymer flocculant | ppm/ppm | 10/0 | 10/0 | 10/0 | 10/0 | |
| Flocculant effect | | | | | | |
| Flocculant speed | mm/min | 32 | 25 | 25 | 25 | |
| Clarity of supernatant | Visual observation | ○ | ○ | ○ | ○ | |
| Clarity of dehydrated filtrate | Visual observation | ○ | ○ | ○ | ○ | |

| Item | Unit | Comparative Example | | | | |
|---|---|---|---|---|---|---|
| | | 1-A | 1-B | 1-C | 1-D | 1-E |
| Type of plant raw material | | Mizuna | Komatsuna | Spinach | Garland chrysanthemum | Perilla frutescens viridis |
| Drying temperature (2 hr) | | 90 | 90 | 90 | 90 | 90 |
| Viscosity of 2% aqueous solution | $10^{-3}$ P · as | 4.9 | 5.3 | 5.0 | 5.2 | 5.6 |
| Colloid equivalent | mEq/g | −0.08 | −0.36 | −0.27 | −0.28 | −0.27 |
| Synthetic polymer flocculant | | — | — | — | — | — |
| Colloid equiavlant value | mEq/g | — | — | — | — | — |
| Viscosity of 0.2% aqueous solution | $10^{-3}$ P · as | — | — | — | — | — |
| Amount added | | | | | | |
| Plant/polymer flocculant | ppm/ppm | 10/0 | 10/0 | 10/0 | 10/0 | 10/0 |
| Flocculant effect | | | | | | |
| Flocculant speed | mm/min | <5 | <5 | <5 | <5 | <5 |
| Clarity of supernatant | Visual observation | × | × | × | × | × |
| Clarity of dehydrated filtrate | Visual observation | × | × | × | × | × |

TABLE 1-continued

| Item | Unit | Comparative Example | | | | | | |
|---|---|---|---|---|---|---|---|---|
| | | 1-F | 1-G | 1-H | 1-I | 1-J | 1-K | |
| Type of plant raw material | | Chinese cabbage | Giant butterbur | Napa cabbage | Cabbage | Minose | Japanese Angelica tree |
| Drying temperature (2 hr) | | 90 | 90 | 90 5.9 | 90 | 90 | 90 |
| Viscosity of 2% aqueous solution | $10^{-3}$ P · as | 5.2 | 5.6 | −0.44 | 5.6 | 6.5 | 3.3 |
| Colloid equivalent | mEq/g | −0.25 | −0.21 | | −0.02 | −4.51 | −3.97 |
| Synthetic polymer flocculant | | — | — | — | — | — | — |
| Colloid equaivlant value | mEq/g | — | — | — | — | — | — |
| Viscosity of 0.2% aqueous solution | $10^{-3}$ P · as | — | — | — | — | — | — |
| Amount added | | | | | | | |
| Plant/polymer flocculant | ppm/ppm | 10/0 | 10/0 | 10/0 | 10/0 | 10/0 | 10/0 |
| Flocculant effect | | | | | | | |
| Plocculant speed | mm/min | <5 | <5 | <5 | <5 | <5 | <5 |
| Clarity of supernatant | Visual observation | x | x | x | x | x | x |
| Clarity of dehydrated filtrate | Visual observation | x | x | x | x | x | x |

TABLE 2

| Item | Unit | Example | | Comparative Example | | | |
|---|---|---|---|---|---|---|---|
| | | 1-E | 1-F | 1-L | 1-M | 1-N | 1-O |
| Type of plant raw material | | Corchorus olitorius | Corchorus olitorius | Corchorus olitorius | Corchorus olitorius | Begonia fimbristipula | banana skin |
| Drying temperature (2 hr) | | 60 | 80 | 100 | 120 | 100 | 100 |
| Viscosity of 2% aqueous solution | $10^{-3}$ P·as | 27 | 25 | 10 | 5.7 | 5.1 | 2.9 |
| Colloid equivalent | mEq/g | −1.23 | −0.49 | −0.19 | −0.15 | −1.23 | −0.25 |
| Synthetic polymer flocculant | | — | — | — | — | — | — |
| Colloid equiavlant value | mEq/g | — | — | — | — | — | — |
| Viscosity of 0.2% aqueous solution | $10^{-3}$ P·as | — | — | — | — | — | — |
| Amount added | | | | | | | |
| Plant/polymer flocculant Flocculant effect | ppm/ppm | 10/0 | 10/0 | 10/0 | 10/0 | 10/0 | 10/0 |
| Flocculant speed | mm/min | 38 | 35 | 10 | x | <5 | <5 |
| Clarity of supernatant | Visual observation | | | 20 | x | x | x |
| Clarity of dehydrated filtrate | Visual observation | | | x | x | x | x |

TABLE 3

| Item | Unit | Example | | | | Comparative Example |
|---|---|---|---|---|---|---|
| | | 1-G | 1-H | 1-I | 1-J | 1-P |
| Type of plant raw material | | Corchorus olitorius | Corchorus olitorius | Corchorus olitorius | Corchorus olitorius | Corchorus olitorius |
| Drying temperature (2 hr) | | 90 | 90 | 90 | 90 | 90 |
| Viscosity of 2% aqueous solution | $10^{-3}$ P·as | 22 | 22 | 22 | 22 | 22 |
| Colloid equivalent | mEq/g | −0.30 | −0.30 | −0.30 | −0.30 | −0.30 |
| Synthetic polymer flocculant | | A | A | A | A | A |
| Colloid equiavlant value | mEq/g | −2.45 | −2.45 | −2.45 | −2.45 | −2.45 |
| Viscosity of 0.2% aqueous solution | $10^{-3}$ P·as | 272 | 272 | 272 | 272 | 272 |
| Amount added | | | | | | |
| Plant/polymer flocculant Flocculant effect | ppm/ppm | 0.5/2.0 | 1.0/1.5 | 1.5/1.0 | 2.0/0.5 | 0/2.5 |
| Flocculant speed | mm/min | 75 | 75 | 61 | 50 | 70 |
| Clarity of supernatant | Visual observation | | | | ○ | |
| Clarity of dehydrated filtrate | Visual observation | | | | ○ | x |

| Item | Unit | Example | | Comparative Example | | |
|---|---|---|---|---|---|---|
| | | 1-K | 1-L | 1-Q | 1-R | 1-S |
| Type of plant raw material | | Corchorus olitorius | Corchorus olitorius | Corchorus olitorius | Corchorus olitorius | Corchorus olitorius |
| Drying temperature (2 hr) | | 90 | 90 | 90 | 90 | 90 |
| Viscosity of 2% aqueous solution | $10^{-3}$ P·as | 22 | 22 | 22 | 22 | 22 |
| Colloid equivalent | mEq/g | −0.30 | −0.30 | −0.30 | −0.30 | −0.30 |
| Synthetic polymer flocculant | | B | C | D | E | F |
| Colloid equiavlant value | mEq/g | −1.29 | −4.15 | −4.40 | −10.9 | −0.01 |
| Viscosity of 0.2% aqueous solution | $10^{-3}$ P·as | 135 | 397 | 460 | 370 | 11 |
| Amount added | | | | | | |
| Plant/polymer flocculant Flocculant effect | ppm/ppm | 0.5/2.0 | 0.5/2.0 | 0.5/2.0 | 0.5/2.0 | 0.5/2.0 |
| Flocculant speed | mm/min | 70 | 63 | 50 | <5 | 10 |
| Clarity of supernatant | Visual observation | | | x | x | x |
| Clarity of dehydrated filtrate | Visual observation | | | x | x | x |

Based on the results of Table 1, it can be known that compared to other plant-derived flocculants (Comparative Example 1-A~Comparative Example 1-K), the plant-derived flocculants of Example 1-A~Example 1-D obtained from *Corchorus olitorius, Begonia fimbristipula*, banana, and *Corchorus capsularis* having a certain colloid equivalent value and aqueous solution viscosity exhibit excellent flocculation properties as settling speed, as well as the clarity of the supernatant after the flocculation treatment and the filtrate after the dehydration filtration.

In addition, it is known by comparing Example 1-E and Example 1-F in which the drying temperature was lower than 100° C. and Comparative Example 1-L~Comparative Example 1-O in which the drying temperature was at least 100° C. that the flocculation performance of Comparative Example 1-L~Comparative Example 1-O is poorer. It is presumed that when the plant raw materials were dried at a temperature of more than 100° C., heat deterioration occurred to one water soluble polymer component of the plant raw materials so as to make the flocculation performance poorer.

Furthermore, for the flocculant mixtures of Example 1-G~Example 1-L which were the mixtures of synthetic polymer flocculants, which were anionic polymer flocculants having certain colloid equivalent values and aqueous solution viscosities, and plant-derived flocculants, it was determined that they had excellent flocculation properties with lower amount of addition (2.5 ppm). it should be noted, when the synthetic polymer flocculants without the certain colloid equivalent values and aqueous solution viscosities (Comparative Example 1-Q~Comparative Example 1-S) were used, and when the synthetic polymer flocculants were used themselves (Comparative Example 1-P), the desirable flocculation effect could not be obtained.

As mentioned above, the flocculants of Example 1, compared to the flocculants of Comparative Example 1 or traditional flocculants, have excellent flocculation properties (for example, settling speed and filtrate turbidity). Moreover, because the flocculants of Example 1 are natural occurring substances, they are renewable and safe to human beings and environment, therefore, the cake (the dehydrated) and coagulum, which have long since been subject to the disposal by burning or dumping, can be re-used as compost or feed. The cake is very easy to be made fuel or compost. From the perspectives of saving resources, reducing harmful substances and effectively using the disposed materials, great contribution can be made to the environmental protection of the earth. Furthermore, since the flocculants of Example 1 have large quantities of plant fiber components, the cake and the flocculate are very easy to be stripped off from the press cloth when the cake and the flocculate are subject to dehydration. Moreover, the cake and the flocculate have deodorization effect on the processing water.

The invention has been illustrated on the basis of the preferred examples, but the invention is not limited by these examples and can have various modifications. In the example, *Corchorus olitorius, Begonia fimbristipula*, banana and *Corchorus capsularis* were used individually, but the same flocculation properties can also been obtained by using the combination of (*Corchorus olitorius, Begonia fimbristipula*), the combination of (*Corchorus olitorius*, banana), the combination of (*Corchorus olitorius, Corchorus capsularis*), the combination of (*Begonia fimbristipula*, banana), the combination of (*Begonia fimbristipula, Corchorus capsularis*), the combination of (banana, *Corchorus capsularis*), the combination of (*Corchorus olitorius, Begonia fimbristipula*, banana), the combination of (*Corchorus olitorius, Begonia fimbristipula, Corchorus capsularis*), the combination of (*Corchorus olitorius*, banana, *Corchorus capsularis*), the combination of (*Begonia fimbristipula*, banana, *Corchorus capsularis*), and the combination of (*Corchorus olitorius, Begonia fimbristipula*, banana, *Corchorus capsularis*).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A flocculant material comprising a plant-derived flocculant having a colloid equivalent of −1.5 mEq/g to −0.20 mEq/g, whose 2 weight % aqueous solution has a viscosity of at least $6.0 \times 10^{-3}$ Pa·s, wherein the plant-derived flocculant is partially soluble in water and comprises at least one dried, pulverized plant material selected from *Begonia*, bananas, and *Corchorus capsularis*.

2. The plant-derived flocculant according to claim 1, which comprises a dried matter of *Begonia fimbristipula*.

3. The plant-derived flocculant according to claim 1, which comprises a dried matter of bananas.

4. The plant-derived flocculant according to claim 1, which comprises a dried matter of *Corchorus capsularis*.

5. The plant-derived flocculant according to claim 1, which comprises a dried matter obtained by drying a plant at a temperature of lower than 100° C.

6. A flocculant mixture, comprising:
a plant-derived flocculant having a colloid equivalent of −1.5 mEq/g to −0.20 mEq/g, whose 2 weight % aqueous solution has a viscosity of at least $6.0 \times 10^{-3}$ Pa·s, wherein the plant-derived flocculant is partially soluble in water and comprises at least one dried, pulverized plant material selected from *Begonia*, bananas, and *Corchorus capsularis*; and
a synthetic polymer flocculant having a colloid equivalent of −4.5 mEq/g to −1.2 mEq/g, whose 0.2 weight % aqueous solution has a viscosity of $1.3 \times 10^{-1}$ Pa·s to $4 \times 10^{-1}$ Pa·s.

7. The flocculant mixture according to claim 6, wherein the plant-derived flocculant comprises at least one dried material selected from a dried matter of *Corchorus olitorius*, a dried matter of *Begonia fimbristipula*, a dried matter of bananas, and a dried matter of *Corchorus capsularis*.

8. The flocculant mixture according to claim 6, wherein when in each unit weight of the flocculant mixture, the weight of the plant-derived flocculant is $W_1$ and the weight of the synthetic polymer flocculant is $W_2$, they satisfy the following conditions:

$$2/8 \leq W_1/W_2 \leq 8/2.$$

9. The flocculant mixture according to claim 8 which satisfies the following conditions:

$$2/8 \leq W_1/W_2 \leq 3/2.$$

10. The flocculant mixture according to claim 6, wherein the synthetic polymer flocculant comprises at least one synthetic polymer flocculant selected from partial hydrolysates of polyacrylamide, copolymers of acrylamide and acrylic acid, and copolymers of acrylamide and metal acrylate.

11. A flocculation method comprising the steps of:
adding to a suspension a plant-derived flocculant having a colloid equivalent of −1.5 mEq/g to −0.20 mEq/g, whose 2 weight % aqueous solution has a viscosity of at least $6.0 \times 10^{-3}$ Pa·s, wherein the plant-derived flocculant is partially soluble in water and comprises at least one dried, pulverized plant material selected from *Begonia*, bananas, and *Corchorus capsularis*; and
flocculating microparticles in the suspension and isolating flocculated materials.

12. The flocculation method according to claim 11, wherein the suspension is a discharged water from a plant.

13. The flocculation method according to claim 11, wherein the plant-derived flocculant comprises at least one dried material selected from the group consisting of a dried matter of *Corchorus olitorius*, a dried matter of *Begonia fimbristipula*, a dried matter of bananas, and a dried matter of *Corchorus capsularis*.

14. The flocculation method according to claim 11, wherein the plant-derived flocculant is dissolved/dispersed in water before adding the plant-derived flocculant to the suspension.

15. The flocculation method according to claim 11, further comprising adding to the suspension a synthetic polymer flocculant having a colloid equivalent of −4.5 mEq/g to −1.2 mEq/g, whose 0.2 weight % aqueous solution has a viscosity of $1.3 \times 10^{-1}$ Pa·s to $4 \times 10^{-1}$ Pa·s.

16. The flocculation method according to claim 15, wherein when in each unit weight of the suspension flocculant, the weight of the plant-derived flocculant added is $W_1'$ and the weight of the synthetic polymer flocculant added is $W_2'$, they satisfy the following conditions:

$$2/8 \leq W_1'/W_2' \leq 8/2.$$

17. The flocculant method according to claim 16 which satisfies the following conditions:

$$2/8 \leq W_1'/W_2' \leq 3/2.$$

18. The flocculation method according to claim 15, wherein the synthetic polymer flocculant comprises at least one synthetic polymer flocculant selected from the group consisting of partial hydrolysates of polyacrylamide, copolymers of acrylamide and acrylic acid, and copolymers of acrylamide and metal acrylate.

19. A method for preparing a plant-derived flocculant, comprising drying at a temperature of lower than 100° C. and pulverizing a plant material selected from *Begonia*, bananas, *Corchorus capsularis*, and mixtures thereof, wherein the plant-derived flocculant is partially soluble in water and has a colloid equivalent of −1.5 mEq/g to −0.20 mEq/g, whose 2 weight % aqueous solution has a viscosity of at least $6.0 \times 10^{-3}$ Pa·s.

20. Use of a plant-derived dried material, comprising:
using the plant-derived dried material for preparing a plant-derived flocculant by drying and pulverizing a plant material selected from *Begonia*, bananas, *Corchorus capsularis*, and mixtures thereof, wherein the plant-derived dried material is partially soluble in water and has a colloid equivalent of −1.5 mEq/g to −0.20 mEq/g, whose 2 weight % aqueous solution has a viscosity of at least $6.0 \times 10^{-3}$ Pa·s.

21. The use according to claim 20, further comprising obtaining the plant-derived dried material by drying the plant material at a temperature of lower than 100° C.

22. The use according to claim 20, further comprising preparing a flocculant mixture by adding to the plant-derived dried flocculant a synthetic polymer flocculant having a colloid equivalent of −4.5 mEq/g to −1.2 mEq/g, whose 0.2 weight % aqueous solution has a viscosity of $1.3 \times 10^{-1}$ Pa·s to $4 \times 10^{-1}$ Pa·s.

23. The use according to claim 22, wherein when in each unit weight of the flocculant mixture, the weight of the plant-derived flocculant is $W_1$ and the weight of the synthetic polymer flocculant is $W_2$, they satisfy the following conditions:

$$2/8 \leq W_1/W_2 \leq 8/2.$$

24. The use according to claim 23 which satisfies the following conditions:

$$2/8 \leq W_1/W_2 \leq 3/2.$$

25. The use according to claim 22, wherein the synthetic polymer flocculant comprises at least one synthetic polymer flocculant selected from the group consisting of partial hydrolysates of polyacrylamide, copolymers of acrylamide and acrylic acid, and copolymers of acrylamide and metal acrylate.

* * * * *